US010997376B2

(12) United States Patent
Ros et al.

(10) Patent No.: US 10,997,376 B2
(45) Date of Patent: May 4, 2021

(54) ELECTRONIC MESSAGE TRANSLATION MANAGEMENT

(71) Applicant: Arm IP Limited, Cambridge (GB)

(72) Inventors: Daniel Ros, Sawston (GB); Robert George Taylor, Cambridge (GB); John-Paul Stanford, Cambridge (GB); Daniel John Ward, Peterborough (GB); Oliver James Ford, London (GB)

(73) Assignee: Arm IP Limited, Cambridge (GB)

( * ) Notice: Subject to any disclaimer, the term of this patent is extended or adjusted under 35 U.S.C. 154(b) by 0 days.

(21) Appl. No.: 16/736,365

(22) Filed: Jan. 7, 2020

(65) Prior Publication Data

US 2020/0226326 A1    Jul. 16, 2020

(30) Foreign Application Priority Data

Jan. 11, 2019    (GB) ...................................... 1900414

(51) Int. Cl.
*G06F 40/58*    (2020.01)
*G06F 40/205*    (2020.01)
(Continued)

(52) U.S. Cl.
CPC ............ *G06F 40/58* (2020.01); *G06F 40/205* (2020.01); *H04L 29/08072* (2013.01); *H04L 63/102* (2013.01); *H04W 60/04* (2013.01)

(58) Field of Classification Search
CPC ....... H04L 51/066; H04L 51/14; H04L 67/04; H04L 67/16; H04L 67/306; H04L 69/08;
(Continued)

(56) References Cited

U.S. PATENT DOCUMENTS

2004/0117068 A1    6/2004  Lee
2004/0215694 A1    10/2004 Podolsky
(Continued)

FOREIGN PATENT DOCUMENTS

CN    108833219 A    11/2018
EP    2512163 A1    10/2012
(Continued)

OTHER PUBLICATIONS

Combined Search and Examination Report under sections 17 & 18(3) for Great Britain Application No. 1900412.6, dated Jun. 14, 2019, 6 pages.
(Continued)

*Primary Examiner* — Soe Hlaing
(74) *Attorney, Agent, or Firm* — Patterson Thuente Pedersen, P.A.

(57) ABSTRACT

A computer-implemented method of operation of a translation manager intermediating message distribution in a plurality of networked devices, comprising receiving at the translation manager a request from a networked device for registration; parsing the message by the translation manager to derive an identifier of the networked device; determining by the translation manager at least one capability of the networked device; creating a pairing of the identifier of the networked device and a profile comprising the at least one capability of the networked device; storing the pairing in a data store for use by the translation manager on request to translate a message. The storing the pairing may comprise populating a lookup table and/or operating a database.

17 Claims, 10 Drawing Sheets

(51) Int. Cl.
  *H04L 29/08* (2006.01)
  *H04L 29/06* (2006.01)
  *H04W 60/04* (2009.01)

(58) Field of Classification Search
  CPC ......... H04L 69/24; H04L 51/06; H04L 67/12;
    H04L 67/303; H04L 69/18; H04L 69/26;
    H04L 29/08072; H04L 63/102; H04L
    63/0442; H04L 63/0435; H04L 69/22;
    G06F 40/58; G06F 40/205; H04W 60/04
  See application file for complete search history.

(56) References Cited

U.S. PATENT DOCUMENTS

| | | |
|---|---|---|
| 2008/0212699 A1 | 9/2008 | Imaeda et al. |
| 2009/0191902 A1 | 7/2009 | Osborne |
| 2010/0030881 A1 | 2/2010 | Moreira Sa De Souza et al. |
| 2012/0262268 A1 | 10/2012 | Mignot |
| 2014/0040445 A1 | 2/2014 | Beckert et al. |
| 2015/0304459 A1 | 10/2015 | Pakula et al. |
| 2017/0171143 A1 | 6/2017 | Ge et al. |
| 2017/0187807 A1 | 6/2017 | Clernon |
| 2017/0359417 A1 | 12/2017 | Chen et al. |
| 2018/0035479 A1 | 2/2018 | Lee et al. |
| 2018/0234326 A1 | 8/2018 | Swierk et al. |
| 2019/0028294 A1 | 1/2019 | Daher et al. |
| 2019/0288913 A1* | 9/2019 | Salgueiro ............... H04L 41/082 |
| 2020/0045546 A1* | 2/2020 | Zhou ....................... H04L 67/12 |
| 2020/0153651 A1* | 5/2020 | Wang ..................... H04L 29/08 |
| 2020/0228389 A1 | 7/2020 | Ros et al. |
| 2020/0228478 A1 | 7/2020 | Ros et al. |

FOREIGN PATENT DOCUMENTS

| | | |
|---|---|---|
| EP | 2571224 A1 | 3/2013 |
| WO | WO-2012152133 A1 | 11/2012 |
| WO | WO 2015/024349 A1 | 2/2015 |

OTHER PUBLICATIONS

Combined Search and Examination Report under sections 17 & 18(3) for Great Britain Application No. 1900413.4, dated Jun. 18, 2019, 6 pages.
Application and File history for U.S. Appl. No. 16/736,314, filed Jan. 7, 2020. Inventors: Ros et al.
Application and File history for U.S. Appl. No. 16/736,333, filed Jan. 7, 2020. Inventors: Ros et al.
Search Report dated Jun. 19, 2019 for Application No. GB1900414.2, 6 pages.
Search Report dated Aug. 20, 2020 for GB Application No. 1900412.6, 2 pages.
Search Report dated Aug. 19, 2020 for GB Application No. 1900413.4, 3 pages.
Examination Report dated Aug. 13, 2020 for GB Application No. 1900414.2, 3 pages.
Examination Report dated Jan. 20, 2021 for GB Application No. 1900414.2, 4 pages

* cited by examiner

ELECTRONIC MESSAGE TRANSLATION MANAGEMENT

RELATED APPLICATION

The present application claims priority to Application No. GB 1900414.2 filed Jan. 11, 2019, which is hereby incorporated herein in its entirety by reference.

The present technology relates to methods and apparatus for operating a computer system to structure electronic messages for transmission and receipt over networks of electronic data processing devices.

In conventional systems, electronic devices attached to networks, and the communications channels composing such networks, have been able to rely on some level of homogeneity in the connected devices and channels, often achieved by installing special-purpose hardware, firmware or software adapters, all under the control of some central entity, such as a server.

In the years since the advent of the Internet and the World Wide Web, there has been a broad extension of the use of computing power and a rapid increase in the interconnectedness of devices capable of storing and processing data. In more recent times, the homogeneity of devices has been disrupted by the proliferation of networked or at least network-attachable devices in what is being called the Internet of Things (IoT), in which various objects and devices may be equipped with some measure of information processing capability. The lack of homogeneity may exist because, for example, devices come from different manufacturers using proprietary protocols or competing standards. It may also arise over time because of the very rapid changes occurring in this developing field of technology.

Typically, IoT devices are connected over communications channels that may be implemented using a variety of wired and wireless networks, interconnected at least intermittently to support message transmission and receipt, often using layers of abstraction so that senders and receivers have less need to know and manipulate the lower levels of protocols by which the underlying networks and service-providing devices provide their functionalities. As an example of the use of such layers of abstraction, cloud computing is a technology whereby users may request various services to be performed by service providers at an abstract level beneath which the operations to supply the service are performed using widely-distributed resources and processors in a flexible way to achieve cost and resource efficiencies.

This complex combination of a ubiquitous computing environment, an extreme abstraction of levels of control and a rapid changeability, typical of modern technology, is the source of much difficulty in data processing and communications.

In a first approach to the many difficulties encountered in properly operating a computer system to structure electronic messages for transmission and receipt over networks of electronic data processing devices, the present technology provides a computer-implemented method of operation of a translation manager intermediating message distribution in a plurality of networked devices, comprising receiving at the translation manager a request from a networked device for registration; parsing said message by the translation manager to derive an identifier of the networked device; determining by the translation manager at least one capability of the networked device; creating a pairing of the identifier of the networked device and a profile comprising the at least one capability of the networked device; storing the pairing in a data store for use by said translation manager on request to translate a message. The storing the pairing may comprise populating a lookup table and/or operating a database.

The method may further comprise, responsive to a device update effective from a time T, updating said at least one device capability profile effective from the time T; and storing an updated pairing in a data store for use by said translation manager on request to translate a message from time T.

In a hardware approach, there is provided electronic apparatus comprising logic components operable to implement the methods of the present technology. In another approach, the computer-implemented method may be realized in the form of a computer program product.

Thus, in relation to the description herein a message to or from a device may be constructed or reconstructed from an instruction based on the capabilities of the device by a translation manager. As used here, where the term "capabilities" is used to signify various characteristics of the device, such as: the feature capabilities of the device or configuration information relating to the hardware or software arrangement of the device. As such, the term capability can be used to refer to features that the device can perform or handling, but also of configuration of the device such as where specific data is stored or how the device is arranged to operate. One or more of these capabilities may alone or in combination dictate how a high-level intent or instruction can be translated in a manner which is appropriate for a device.

Capabilities which can influence the construction of a message can include:
  storage capacity which can influence the size of message payloads or update payloads that can be handled by the device thus triggering the service to separate a message into smaller messages or to re-define an update manifest to instruct the device to obtain multiple smaller software update payloads;
  processing capability which can influence the manner in which a device is instructed to perform processing;
  power availability and continuity (for example in battery-driven or power-harvesting devices) which can influence the timing or configuration of a message to optimize the power resources of the device;
  connectivity availability and continuity (for example, in intermittently connected mobile networks) which can influence the timing or configuration of a message to optimize the connectivity availability of the device;
  resource locator addressing and storage configuration, where resource locator addressing relates to an address (such as User Resource Indicator (URI) at the device at which a particular resource (such as the address of a lightweight-M2M (LwM2M) resource at the device) is located, which can differ between devices and thus a message may be translated differently for different devices to ensure correct access to the appropriate resource;
  support for algorithms that accept and read various types of download manifest, where a download manifest defines the manner in which a download is to take place, and which can rely on different algorithms or processes;
  support for algorithms for delta updates (updates that comprise modification instructions and reduced amounts of data, as opposed to full data replacement updates) which can define the manner in which an update is instructed to the device to ensure that the operations instructed of the device can be performed;

transmission formats and protocols such as support for one or more different transport-layer protocols;

support for different data representations, orderings and encodings;

response message formats and protocols;

response message requirements for action by recipients;

support for various one or more types of encryption and authentication methods and algorithms;

support for various one or more types of compression; and the like—further examples will naturally occur to one of skill in the art.

The term "capabilities" can thus be understood to include both the positive capabilities of the device and also any constraints or limitations associated with the device, as well as configuration or arrangement characteristics which can differ between devices.

At least some of these capabilities may comprise feature support for Lightweight Machine-to-Machine (LWM") 2M) communications. Capabilities may thus comprise any of the hardware, firmware or software capabilities that the device supports. The capability to handle any particular form of cryptographic representation, for example, varies from device to device. Examples include whether a device supports symmetric or asymmetric key cryptography. For example, a device could support public key cryptography or a particular type of security certificate, or perhaps whether the device supports communication by means of a particular protocol or is connected (permanently or intermittently) to a particular network. In the public key cryptography example, the message could be packaged in a cryptographic representation using a private key when the device is determined to be capable of receiving and decrypting such a message using the corresponding public key. If, on the other hand, the device does not support public key encryption, then some other method, such as a shared-secret method, may be used, or the message may be re-examined to determine whether or not it is suitable to be sent in clear in this instance.

One possible example of a device limitation is a lack of continuous access to a power supply in, for example, a power-harvesting IoT device. A further example is lack of continuity of available bandwidth over a communications channel. One of ordinary skill in the art will immediately understand that many other capabilities and limitations of devices may need to be accommodated in order to achieve a truly flexible heterogeneous network. For any given device, a capability profile may be created, whereby the capabilities of the device may be enumerated. As will be clear to one of skill in the art, such a capability profile comprises a broader set of data than any conventional device configuration data, and its assembly into a conveniently-handled, transmissible entity that is susceptible to querying provides a broad range of possible use-cases.

Similarly, a configuration or arrangement characteristic can influence the construction of a message and thus could form part of a device capability profile. In an example, a configuration or arrangement characteristic could include the location (such as a URI) at the device of a specific resource, such as a LwM2M resource or a particular memory location from which data can be received.

Implementations of the disclosed technology will now be described, by way of example only, with reference to the accompanying drawings, in which.

The present technology thus provides computer-implemented techniques and logic apparatus for processing a message that is to be delivered to multiple end devices, each with different capabilities and limitations, so that the message is provided to each end device in a manner appropriate to the capabilities and limitations (for example, hardware capabilities such as memory size and bus bandwidth) of that device or of the network pathways over which the device communicates. This may be achieved by providing an update-capable registry that links device IDs and/or device class IDs with capability and limitation data, so that device-agnostic messages and message structures may be used by senders with the assurance that messages will be structured or constructed in such a way that the individual devices or classes of devices will be able to receive and understand them, and so that return messages from them may be correctly interpreted and acted upon. The update-capable registry according to the present technology may be time-sensitive, so that an update that affects the capabilities or limitations of a device or class of devices may be correctly synchronized to avoid message loss.

Figure 1:
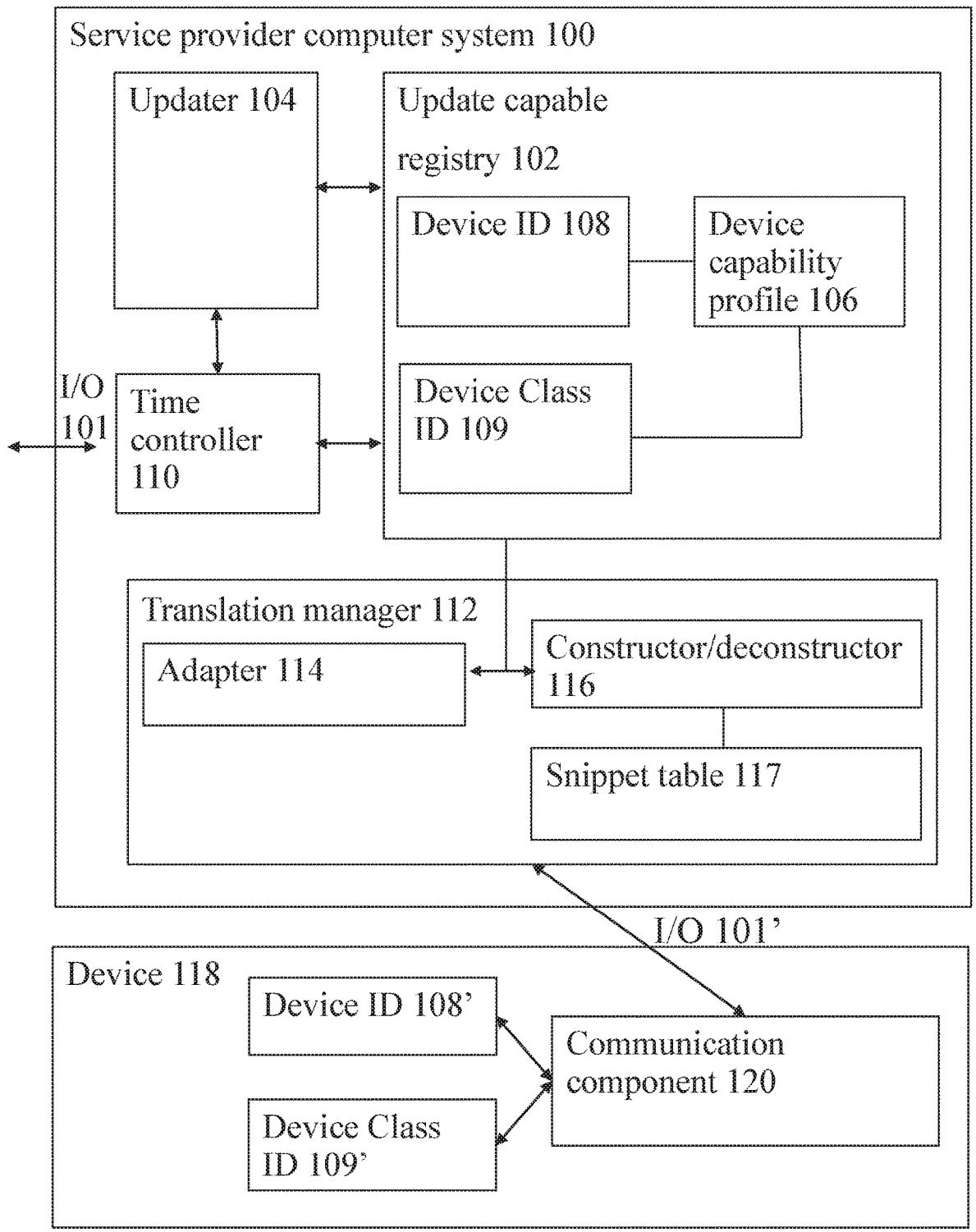
FIG. 1 shows a block diagram of an arrangement of logic, firmware or software components by means of which embodiments of the presently described technology may be implemented.

In FIG. 1, there is shown a block diagram of an exemplary service provider computer system 100 comprising logic components, firmware components or software components by means of which the presently described technology may be implemented, and operable to be connected by electronic means to device 118. Typically, the components of such a system will be segmented and distributed among physical entities comprising a network, and one or more of the components may be virtualized by being presented as if located at a single physical entity while being, in fact, segmented and distributed over a network arrangement such as a cloud to achieve load-balancing, network optimization and the like. Some components may also comprise integrated systems, such as system-on-chip (SoC) devices, in which plural of the components are integrated into a single device. It is also possible that some devices may be operable for multiple purposes. In one example, in a mesh network, a device may have its own information storage and processing functions, but may also be operable as a router to forward messages in a hop-by-hop fashion across the mesh network. Similarly, in certain networked storage control systems, a storage device controller may also be elected as a controller or arbiter for device-to-device communications in a loop or network topology.

In FIG. 1, service provider computer system 100 is operable to be coupled to device 118 by electronic means, which may comprise, for example, wired or wireless connections, such as wireless local area networks or hybrid wired/wireless networks like the Internet. Service provider computer system 100 is equipped with I/O channels 101, 101' for communication with other entities; as shown in FIG. 1, I/O channel 101' may be used to communicate with communication component 120 (which may comprise a conventional transceiver component) at device 118. I/O channels 101, 101' may communicate using any types and combinations of electronic communications means, and the communications means used may be controlled according to device capabilities as described.

Service provider computer system 100 comprises an update-capable registry 102, operable to store one or more instances of device capability profile 106 with respective device IDs 108 and/or device class IDs 109. Device IDs 108 and device class IDs 109 have their counterparts (Device IDs 108' and device class IDs 109') in the attached or attachable device 118, which is operable to use them in conjunction with its communication component to identify itself and its class during communication activity. For example, a new device attaches to a network. It uses a storage accessor to access the storage containing device information and reports its device ID 108', and optionally its device class ID 109', and other characteristics including its capabilities and limitations to service provider computer system 100, which creates a registry entry linking a device capability profile 106 to device ID 108 (and optionally device class ID 109) in update-capable registry 102.

Device capability profiles 106 may be received into update-capable registry 102 by way of I/O channel 101, and updates to device capability profiles may be controlled by updater 104. In some embodiments, time controller 110 may be operated to control the effective time periods of updates to the contents of update-capable registry 102, such that an update may become effective at a specified moment, prior to which a previous entry in update-capable registry 102 remains valid. A mechanism may in this way be provided to allow synchronization of changes at service provider computer system 100 and device 118. For example, if the capabilities or limitations of a device are to be changed because a hitherto unenabled function in the device is to be enabled, it is necessary to ensure that messages to be received by that device only start to use that function after the action to enable the new function has completed.

Service provider computer system 100 also comprises translation manager 112, which is operable to translate, adapt or structure messages according to information known about the capabilities and limitations of device 118 and possibly of the communications channel by means of which messages are communicated to and from device 118. The word "structure" is used here to indicate the act of arranging a message payload and any additional controls—this may constitute translation of a message that is to be forwarded, or it may constitute constructing a message from information elements ("snippets") held in a store according to parameters received with a trigger instruction message. For example, a trigger instruction message may instruct translation manager to construct an error message from a set of snippets (stored in snippet table 117) comprising an error code, an error explanation, and an error recovery hint. In such an instance, the trigger instruction message itself is never sent to or received by the device 118, but only the message constructed from the specified snippets. For this purpose, translation manager 112 is equipped with constructor/deconstructor 116 and snippet table 117.

In one implementation, a "campaign" of messages is planned, meaning that one or more messages are intended to be broadcast to plural devices using a level of automation—for example, a series of messages urging application of a needed fix is intended to be sent to all users of a particular class of device. In such a case, rather than composing a message each time from scratch, a campaign of messages may be set up to be triggered from time to time, and the messages can be constructed on-the-fly from pre-prepared "snippets". As will be clear to one of skill in the art such campaign messages may be intended for broadcast to all devices in a network or a subnet of a network, or they may be targeted at specific devices or classes of device.

In other instances, translation manager 112 is operable to use adapter 114 to adapt the requisite message to accommodate the capabilities and limitations of device 118. The adaptations offered by adapter 114 may include, for example, protocol conversions, packet changes, communications scheduling and timing manipulations, and the like transformations of both messages for transmission and response messages. It will be immediately clear to one of ordinary skill in the art that many other types of transformation or construction will be enabled by the present technique. In one example implementation, translation is achieved by use of one or more libraries comprising callable translator scripts operable to translate messages and event notifications, such as responses, according to device capability profiles. In one possible implementation, a minimal device capability profile may be used for devices that have not previously registered a profile.

Figure 2:
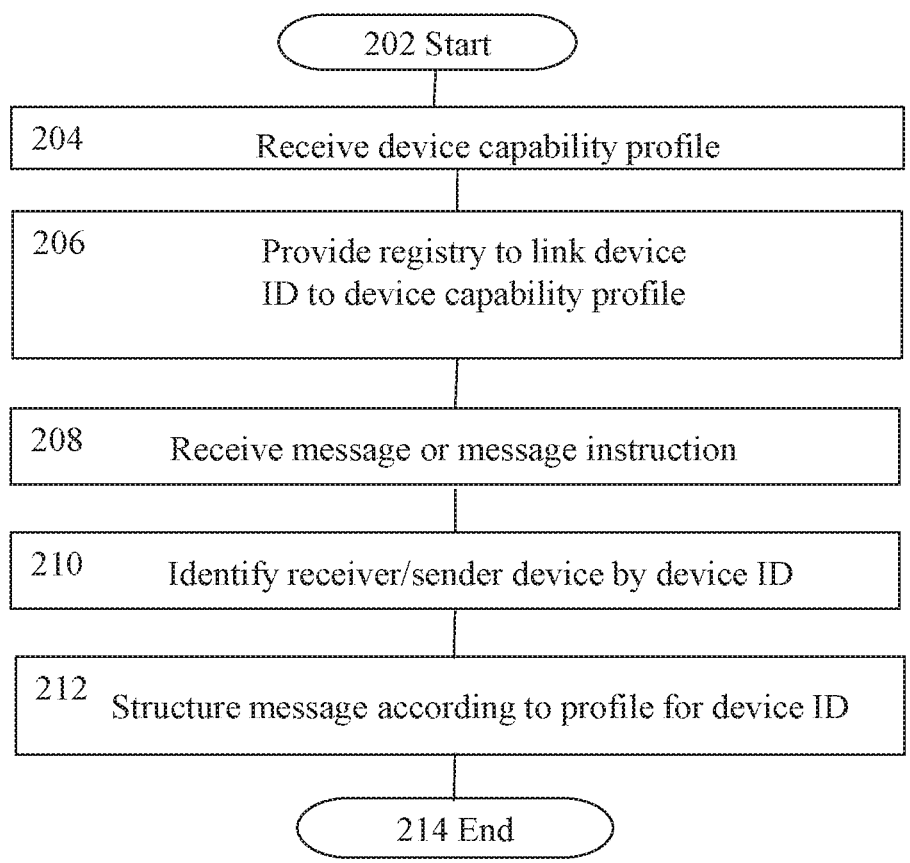
FIG. 2 shows an example of a method of operation in a system of electronic message control according to an embodiment of the present technology.

Turning now to FIG. 2, there is shown one method 200 of electronic message control according to an aspect of the present technology, operable in, for example, a service provider computer system 100 as shown FIG. 1. In FIG. 2, the method begins at Start 202, and at 204, a device capability profile is received, typically by a component of a service provider computer system 100. At 206 at least one device ID is linked to the device capability profile and the at least one resulting device ID-device capability profile pair is stored in, for example, an update capable registry 102 shown in FIG. 1. At 208, a message or a message is received at service provider computer system 100. At 210 a receiver/sender device is identified by device ID, at 212 the message is structured according to the device capability profile indexed by the relevant device ID, and the process completes at End 214.

Figure 3:
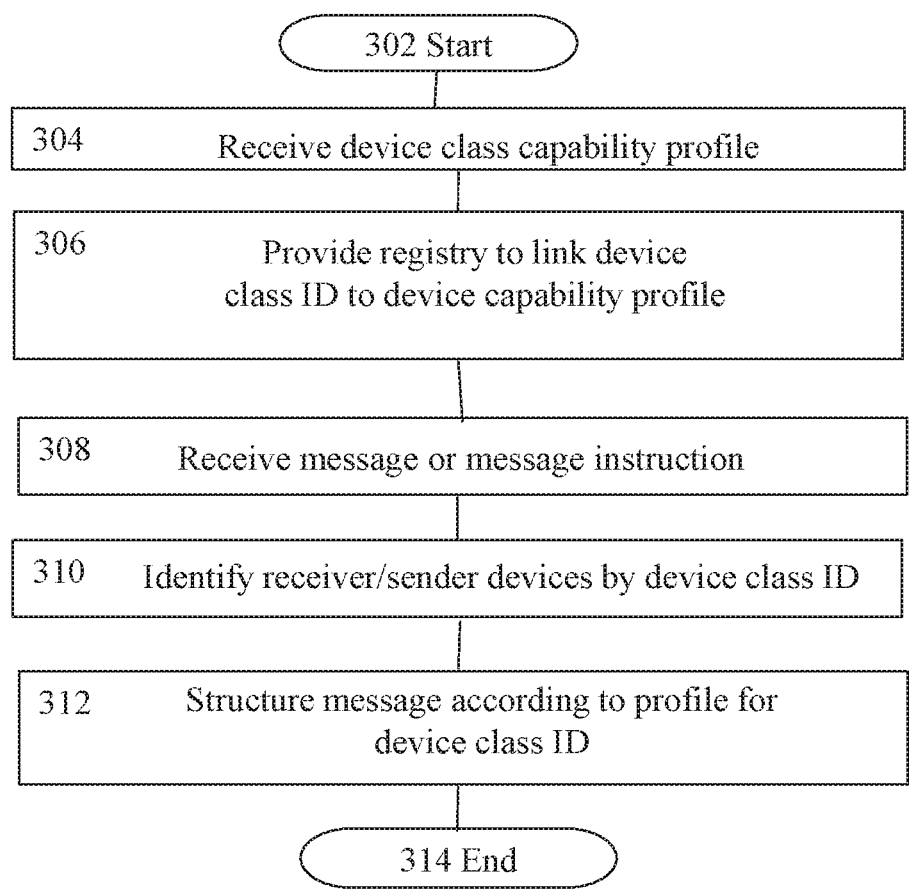
FIG. 3 shows a further example of a method of operation in a system of electronic message control according to an embodiment of the present technology.

FIG. 3 shows a further method 300 of electronic message control according to an aspect of the present technology, operable in, for example, a service provider computer system 100 as shown FIG. 1. In FIG. 3, the method begins at Start 302, and at 304, a device class capability profile is received, typically by a component of a service provider computer system 100. A device class capability profile may specify, for example, a minimum set of capabilities associated with a class of devices, or it may provide an exhaustive catalogue of capabilities and limitations associated with the class of devices. At 306 is provided a registry to link at least one device class ID to the device class capability profile and store the at least one resulting device class ID-device class capability profile pair in, for example, an update capable registry 102 shown in FIG. 1. At 308, a message or a message is received at service provider computer system 100. At 310 a class of receiver/sender devices is identified by device class ID, at 312 the message is structured according to the device class capability profile indexed by the relevant device class ID, and the process completes at End 314.

With the development of the Internet of Things (IoT), devices which were not conventionally equipped to store and process data are becoming so equipped. One example is that of a domestic refrigerator that is provided with the capability to recognize encoded data associated with a perishable food item, storing the data in device storage, and subsequently warning a user over a network to a smartphone of an impending "use by" date for the food item. Further examples of items of daily use might include network-connected phones, wearable fitness trackers and navigational devices. Examples in the world of commerce include trackable in-transit cargo monitors, networked manufacturing machines, sensors attached to energy distribution channels, in-car management systems, and the like. Such extended capabilities for networking devices bring advantages, but at the same time the connected or connectable devices, and possibly the communication means by which they are connected, may be very varied in their capabilities and limitations. As mentioned briefly above, this variability may arise for a number of reasons. These may include differences in protocols at various layers of the network stack, differing standards adopted by different manufacturers, and the like. This difficulty is exacerbated by the rapid changes taking place in this relatively new field of technology, which means that the capabilities of devices and networks, and their limitations, may change over time.

In one implementation, a user uploads a message to a cloud message service with the intention of having the message distributed to some subset of a set of devices in the network. The cloud message service then delivers the message to each intended end device. However, in practice the end devices and their communication channels may have different capabilities and limitations. For example, some end devices may have reduced hardware capabilities such as less memory, lower processing power, reduced battery life, limited time windows for connection to the network, or different communication protocol connections.

As well as hardware and firmware capabilities and limitations, there may also be software capabilities and limitations, such as support for or lack of support for delta updates or recurrent neural network updates. Delivering the same message to each device in the same delivery manner can result in message failure issues for a number of reasons. For example, some devices may have insufficient memory to store the entire message payload at once or the downloading and immediate installation of a payload containing an update to firmware or software may cause performance issues in devices with constrained processing capabilities. Further, the response messages sent back by devices may encounter similar incompatibility problems, so that some acknowledgement and return code messages may be unusable. Some examples of response messages of this type are operational success or failure indicators, download progress indicators, and indicators as to the coverage of broadcast messages.

In one implementation of the present technology, the message service maintains data about of the capabilities of each device for which it provides the service—for example in a capability database. This knowledge may be in the form of a set of associated capabilities or limitations for each individual device or in the form of a characterisation of each device into one of several different categories of device (e.g. devices that have little memory, Bluetooth-only devices, devices currently running particular software versions). The cloud message service then receives the message payload or instruction to send a message from the customer, processes the message (or constructs a message from stored snippets based on parameters received in a trigger instruction message) into a form appropriate for the end devices based on the stored capabilities of the individual devices or classes of devices and delivers the processed message to each device in a manner suitable for that device. Importantly, the message payload itself does not change, but the method of delivery of that payload is changed to be suitable to that device.

Figure 4:
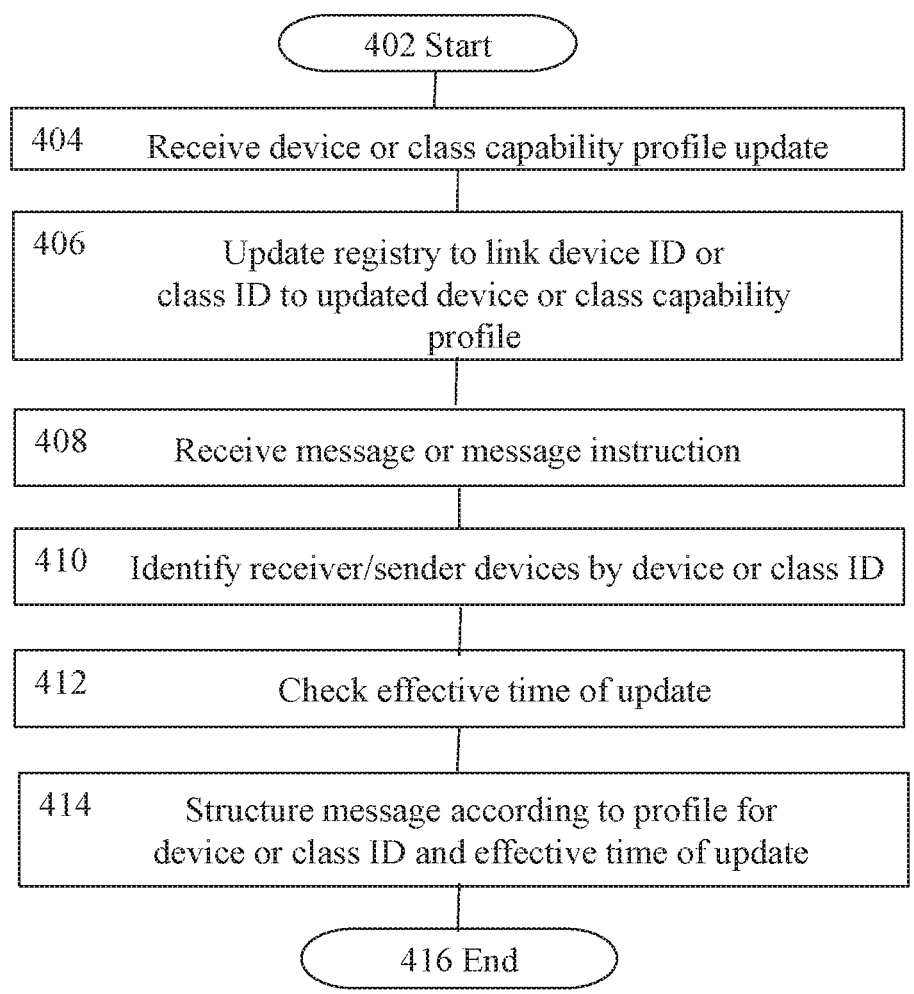
FIG. 4 shows further aspects of a method of operation in a system of electronic message control according to an embodiment of the present technology.

In FIG. 4 are shown further aspects of a method 400 of operation in a system of electronic message control according to the present technology. In FIG. 4, the method starts at Start 402, and at 404, a component of a computer system, such as service provider computer system 100, receives a device or class capability profile update. As will be clear to one of ordinary skill on the art, receipt of such updates is typically a regular occurrence when devices are deployed in the field and left for long periods—changes in the computing environment such as improvements to service provider systems, other communicating devices, network infrastructure and the like are inevitable in a fast-moving technological world, and such changes must be accommodated. At 406, then, the registry is updated to reflect the change by linking the relevant device or class ID to the updated device or class capability profile. When a message or message instruction is received at 408, the relevant sender or receiver device or devices is or are identified at 410 by device or class ID. To ensure that the appropriate structuring of the message can be accomplished, at least one component of the system of electronic message control must determine whether the updated capability is effective according to the time of the message to be sent or received. In practical terms, it is no use to structure a message according to an updated profile until the relevant capability has been deployed for a device or class of devices, nor is it sensible to continue sending back-level messages after an update has been effected. At 412, the effective time of the update is checked, and at 414, the message is structured according to the appropriate profile for the device or class according to the effective time of the update. The method terminates at End 416.

In one scenario, picture a cloud-based network having many varied devices, such as IoT devices, attached (or possibly intermittently attachable) to it. As devices and networks evolve over time, the low-level control code—machine code, firmware, and operating system software, for example, requires updating. The code payloads need to be received, stored, possibly scanned to detect and prevent malicious activity, possibly compiled, link-edited or otherwise transformed, and installed in an executable form. These update operations all have implementation costs in terms of, for example, actual time the device or network may be out of service, processor use time, network bandwidth consumption, energy consumption, and storage footprint.

In one instance of this scenario, a user uploads a firmware update to a cloud update service with the intention of having the update distributed to devices in the network. The cloud update service then delivers the update to each end device. However, in practice the end devices and their communication channels may have different capabilities and limitations. Delivering the same update payload to each device in the same delivery manner can result in update issues. For example, some devices may have insufficient memory to store the entire payload or the downloading and installation of the update may cause performance issues in devices with constrained processing capabilities. In one implementation of the present technology, the cloud update service maintains data about of the capabilities of each device as described above. The cloud update service then receives the software update from the customer, processes the update image into a form appropriate for the end devices based on the stored capabilities of the individual devices or classes of devices and delivers the processed firmware to each device in a manner suitable for that device. Importantly, the payload itself does not change, but the method of delivery of that payload is changed to be suitable to that device. This may be done in a number of different ways, for example:

- separating the firmware image into a number of smaller portions that can individually be stored in the memory of devices that have a small memory capacity;
- separating the firmware image into a number of smaller portions that can be provided over the course of several days for devices with a limited battery life, constrained power delivery or limited cloud access;
- timing the delivery of software within a pre-determined time-limited access windows (e.g. a pre-determined time each day); or
- formatting the firmware update for delivery over an appropriate communication protocol.

In another implementation, a message that is to be sent may be a "campaign" message—that is, a message that is intended to be widely distributed across devices in the network, possibly as part of a series of related messages, to achieve a specified end. For example, it may be that a sequence of messages of increasing urgency may need to be sent to tell users of a class of devices that they must take an action. Such messages may be rather formulaic, and may be easily constructed from stored elements, or "snippets" that can be assembled into complete messages at will. For a campaign message, for example, exhorting update of an antivirus program, the snippets may comprise fixed elements and variable elements, the variable elements depending on the progress of the campaign. So, for example, the first message of the campaign may comprise the fixed snippet "Update your antivirus program" and variable snippets indicating the degree of urgency: "For information", "Urgent" and "Warning". As the campaign progresses, so the level of urgency in the variable snippet is progressively increased. In each case, the initiator of the messages sends a trigger message to the message control system, and the message control system assembles the message from the stored snippets in accordance with parameters sent with the trigger message. The message control system is thus operable to accept message snippets and store them ready for assembly into complete messages on receipt of the trigger messages. As will be immediately clear to one of ordinary skill in the art, the above example is rather trivial, and in reality, more complex assemblies of snippets will be more typical.

Figure 5:
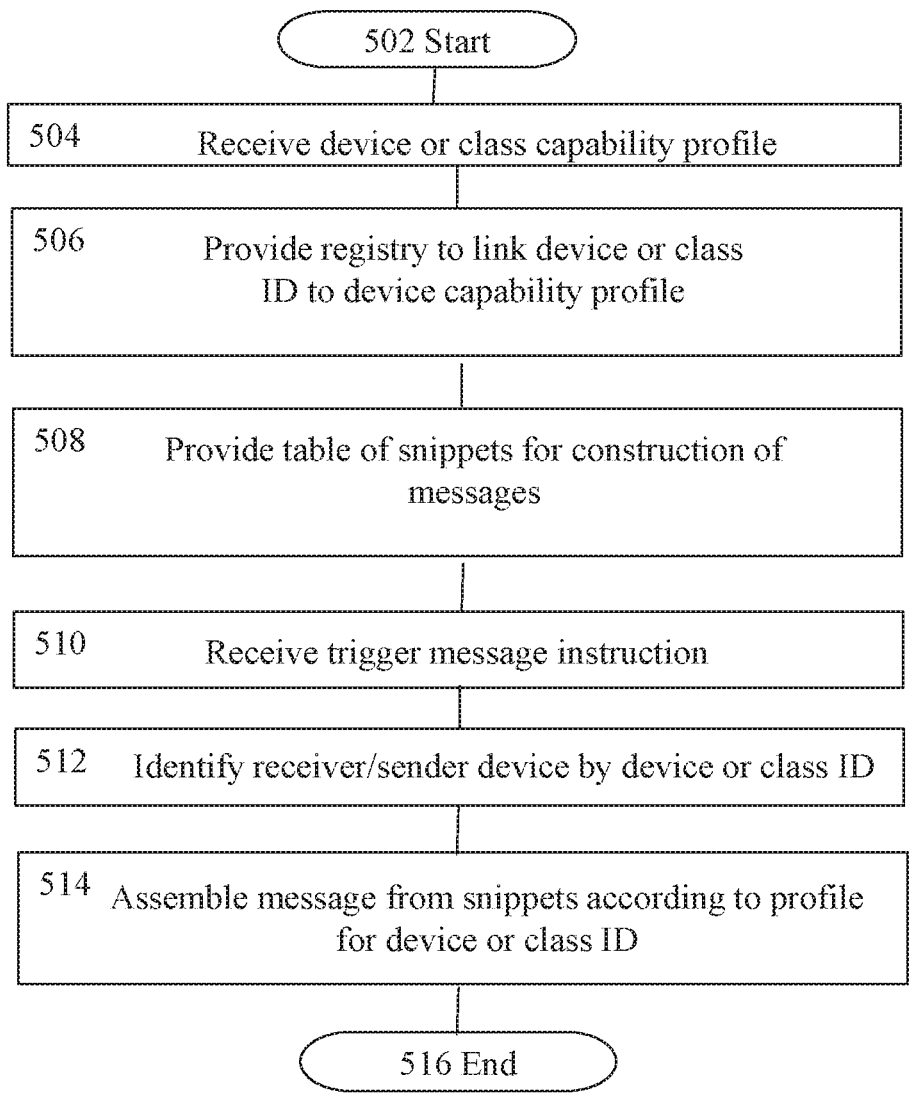
FIG. 5 shows additional aspects of a method of operation in a system of electronic message control according to an embodiment of the present technology.

Thus, turning to FIG. 5, additional aspects of a method 500 of operation in a system of electronic message control according to the present technology are shown. After Start 502, at 504, a device or class capability profile is received by a component of a computer system, such as service provider computer system 100 of FIG. 1, and at 506 a registry, such as the update capable registry 102 of FIG. 1, is provided to link a device or class ID to the device or class capability profile. At 508, a table of snippets is provided and populated with fixed and variable snippets for the construction of messages on receipt of trigger messages from message initiators.

Fixed snippets may be stored in full or compressed formats, depending on the storage capabilities of the underlying system. Variable snippets may comprise, for example, selectable list items as described above, or may comprise means for generating message portions, as for example resolvable macro-instructions or the like. At 510, a trigger message instruction is received from an initiator. The trigger message may comprise parameters for controlling the structuring of the output message—for example, it may contain parameters indicating selections from a list of message snippets, or it may comprise parameters to control the resolution of stored macro-instruction expansions. At 512, the relevant receiver or sender device is identified by its device or class ID, and at 514, the message to be sent in response to the trigger message is structured from the snippets according to the relevant capability profile for the device or class of devices. The process completes at 516.

Figure 6:
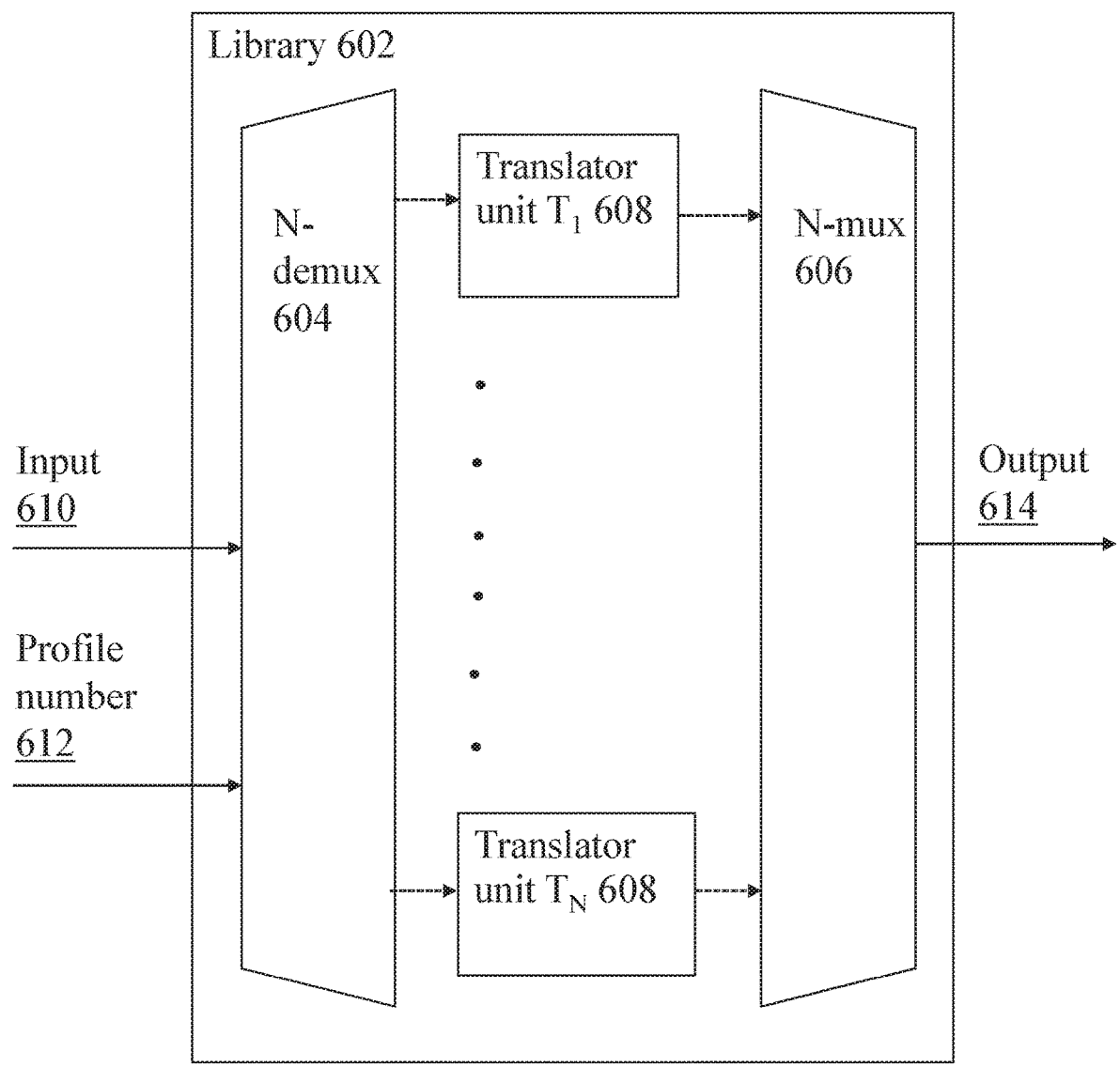
FIG. 6 shows an implementation of a translation library system according to an embodiment of the present technology.

Turning to FIG. 6, there is shown a block diagram of an implementation of a translation library system 600 according to an embodiment of the present technology. Library 602 is available for calling from other entities within the computing system, and input parameters take the form of at least an input 610 and a profile number 612 or similar identification. The profile number 612 refers to a device capability profile, as described hereinabove, and may be associated with an individual device or a class of devices. An N-width demultiplexer N-demux 604 accepts and demultiplexes input parameters and selects a translator unit 608 from a range of translator units $T_1$-$T_N$ based on profile number 612, to perform the translation of input 610. N-width multiplexer N-mux 606 then multiplexes outputs 614.

Figure 7:
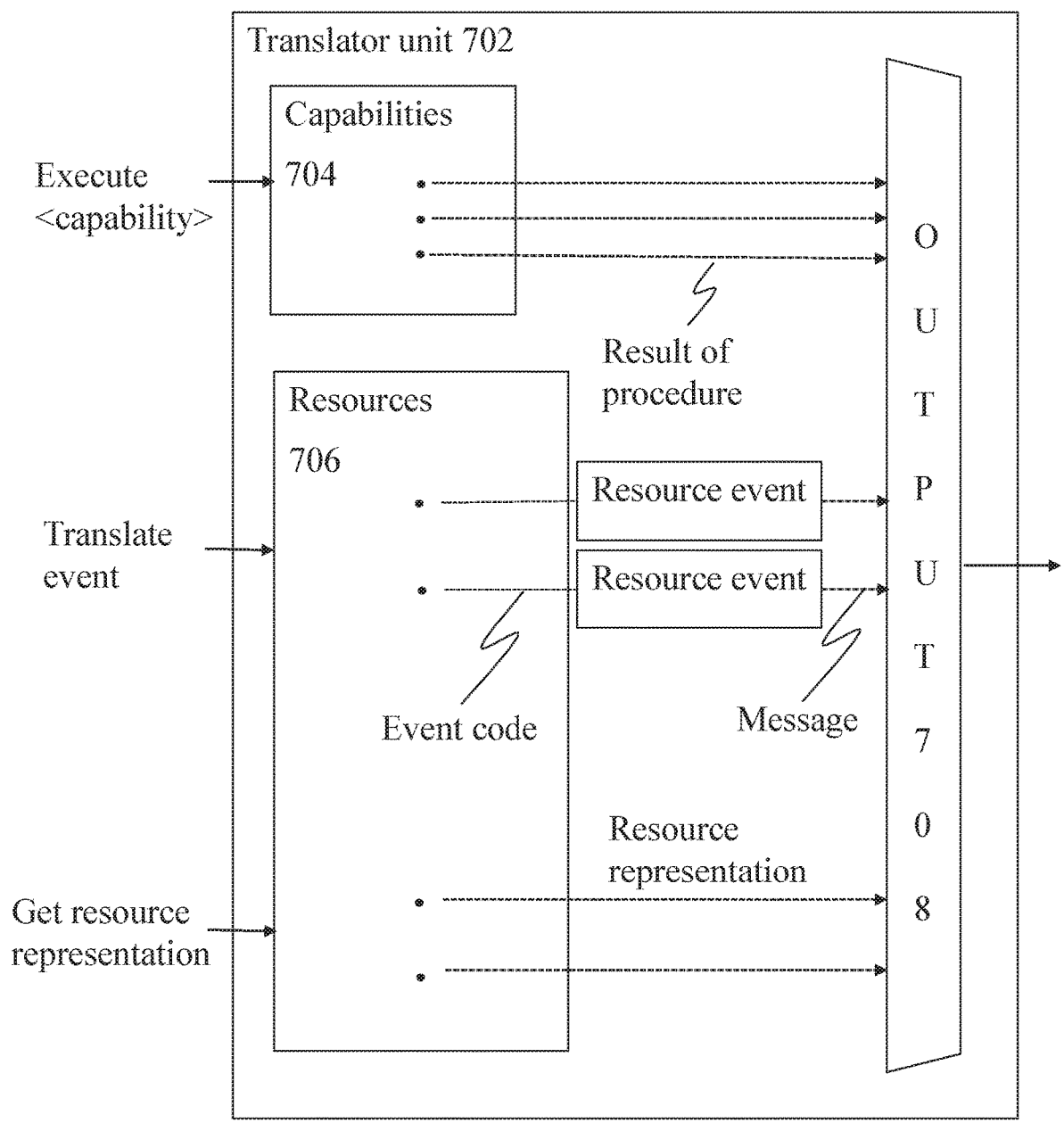
FIG. 7 shows an implementation of a translator unit according to an embodiment of the present technology.

Translator unit 608 is represented in more detail in FIG. 7, now described. In FIG. 7 is now shown translator unit 702, operable according to inputs such as Execute <capability>, Translate <event> and Get resource representation. Translator unit comprises data relating to capabilities 704 and resources 706. Responsive to an Execute <capability> input, translator unit 702 invokes capabilities 704 and passes the result of the associated procedure to output 708. An example of an Execute <capability> input might be represented as a program call as MyProfile.update_manifest_version(device), which would, as part of the process of providing a firmware update suited to a device's capabilities, invoke the MyProfile procedure of the translation library to locate the update manifest version suitable for the capabilities of the device specified by the device parameter and to supply the result to output 708.

Responsive to a Translate <event> input, translator unit 702 invokes resources 706 using the event code to structure the or each selected resource event into a message for passing to output 708. An example of a Translate <event> input might be represented as a program call as MyProfile.update_result_events(42), which would, as part of the process of handling an inbound event (such as an error response) from a device, invoke the MyProfile procedure of the translation library to locate the event code 42 provided by the sending device and to supply the result to output 708 in a generalized form suitable for subsequent translation according to the capabilities of a consuming device or component.

Responsive to a Get resource representation input, translator unit 702 selects the requested representation from resources 706 and passes it to output 708. An example of a Get resource representation input might be represented as a program call as MyProfile.update_state which would invoke the MyProfile procedure of the translation library to locate a resource representing an update state and to supply the result to output 708.

There will now be shown one example, expressed in JavaScript Object Notation (JSON) with ellipses ( . . . ) added to show omissions, of an implementation in which a user or initiator wishes to retrieve data about the update state of a device.

```
{
    "$dynamic": [
        {
            "address": "coap://3/0/2",
            "name": "serial_number",
            "storage": "directory_attribute"
        },
        {
            "address": "coap://10252/0/1",
            "name": "manifest"
        },
        {
            "address": "coap://10252/0/2/",
            "events": [
                {
                    "generic_code": "STATE_UNINITIALIZED",
                    "human_readable_text": "Uninitialized",
                    "specific_code": "UPD2_STATE_0",
                    "top_level_code": "INFO",
                    "trigger_value": "0",
                    "variables": [
                        "device_id",
                        "campaign_id",
                        "manifest_hash"
                    ]
                },
                {
                    "generic_code": "STATE_IDLE",
                    "human_readable_text": "Idle",
                    "specific_code": "UPD2_STATE_1",
                    "top_level_code": "INFO",
                    "trigger_value": "1",
                    "variables": [
                        "device_id",
                        "campaign_id",
                        "manifest_hash"
                    ]
                },
                ...
            ],
    "$format": 1,
    "$profile_description": "Mbed Client Lite",
    "$profile_id": 2,
    "$static": [
        {
            "category": "capability",
            "name": "update_manifest_version",
            "value": 2
        },
        ...
    ]
}
```

The first section of the JSON example contains definitions of some Lightweight Machine-to-Machine (LWM2M) resources that are expected to be on the device; one of them has an "events" key that maps instances of "trigger_value" (the stored value in that resource) to their meaning to the service (or service user). The "variables" are fields stored in the service which are relevant to attach to the event.

These JSON profiles may be transformed into usable form to create a library of translator units (one for each profile) with a common interface. In this example, reference is made to profile 2.

A program or script may contain 'device.api' to access the library to retrieve the 'device' variable that represents a device in the service. In the present example, there may be two profiles stored: profile 1 and profile 2. The common interface is a programming 'object' with attributes to access a representation of each LWM2M resource. Thus, for example, a program or script may execute 'device.api.update_state' to access the 'Update State' resource, wherever it happens to be located on the device itself, and the location of the 'Update State' resource may be different in devices having profile 1 and devices having profile 2.

Figure 8:
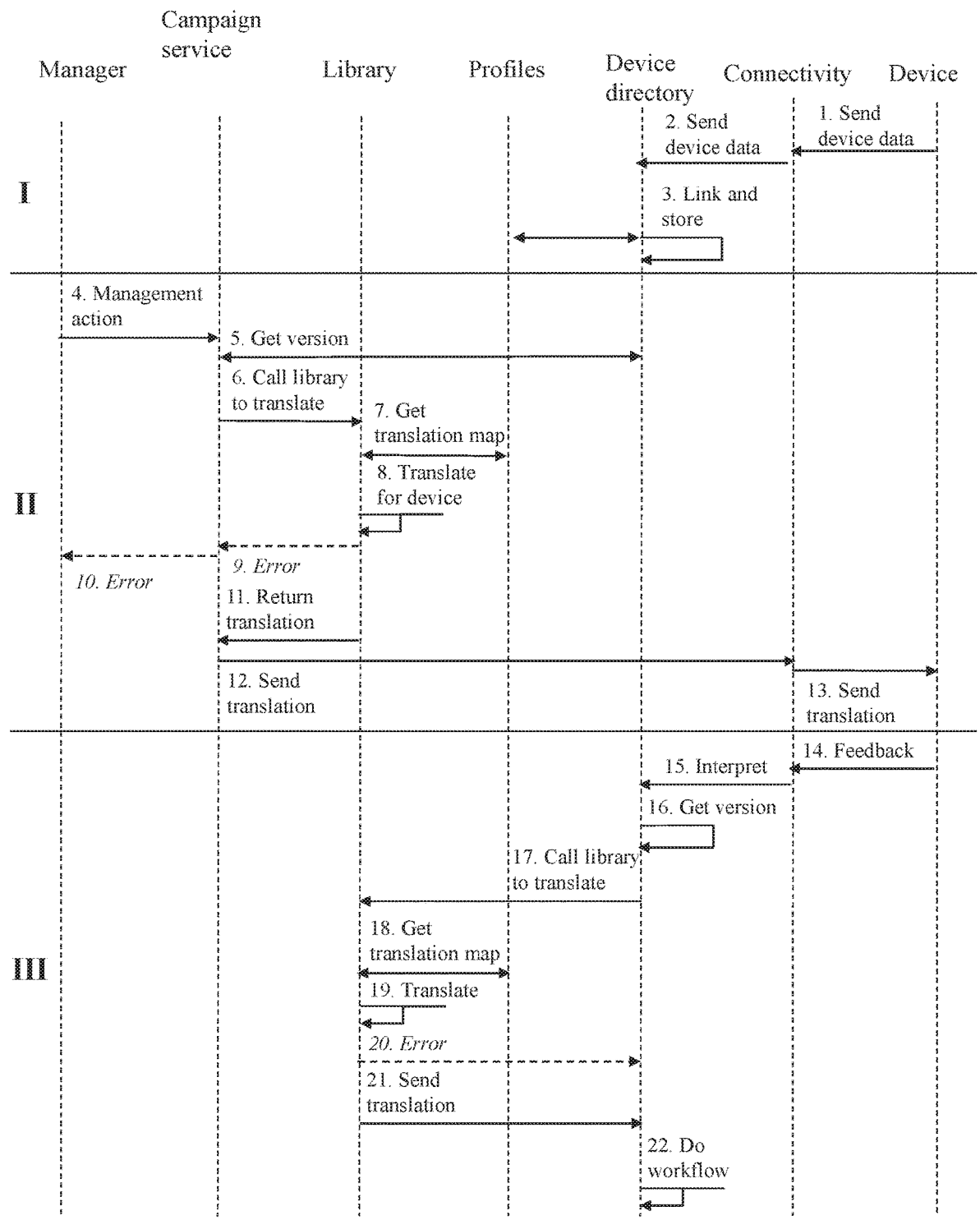
FIG. 8 shows an example of message flows in a device network according to an embodiment of the present technology.

FIG. 8 shows an example of message flows in a device network according to an embodiment of the present technology. The device network of FIG. 8 comprises a Manager, which can be any initiator of an intended action that requires intermediation by a translator service according to embodiments of the present technology. In the example shown in FIG. 8, the Manager may be a provider of updates (for example, firmware updates) that are to be distributed as part of a campaign to various devices in, or attachable to, the network. The network may further comprise a Campaign service that acts on behalf of the Manager to control the translation of campaign messages by the Library layer using the Profiles, and to forward the translated messages to the devices here exemplified by the rightmost column labelled "Device". Devices are operable in electronic communication through a Connectivity layer to a Device Directory. The message flows are divided, for ease of description only, into three phases separated by horizontal dividing lines. The phases are identified for convenience of explanation as I, II and III, but no sequence is implied between phases II and III.

The message flows of FIG. 8 begin in phase I, when a device in the Device layer at step 1 sends its identifying data to the Connectivity layer for onward sending at step 2 to the Device Directory. The identifying data may comprise a device ID, and, in some embodiments, further data, such as data specifying a device class or a firmware version. At step 3, the Device Directory layer creates a link between the device identifier and a capability profile and stores the data and link for use during the translation process. The Device Directory layer may, in embodiments, derive the device capability profile from data sent by the device, for example, in response to a discovery action, or it may derive the device capability profile from data located elsewhere—in one example, device capability data may be acquired from a database of device data stored at, or supplied by, a device manufacturer or distributor.

Phase II starts when Manager, at step 4, sends to the Campaign service a management action, which may take the form of a "statement of intent" in a generalized formal language not directed to any particular device capability class. The management action may, for example, specify a set of firmware updates to be distributed in circumstances in which the Manager has no awareness of the firmware version levels installed on the devices. Thus, for some devices, a detailed knowledge of the update version levels of the devices would indicate that for some devices only some of the updates in the "statement of intent" are needed, while for other devices the full set of updates are required. Responsive to the management action of step 4, the Campaign service gets per-device (or per-device-class) version information from the Device directory at step 5, and calls the Library to perform the translation according to the selected version at step 6. At step 7, the Library retrieves from the Profiles the translation map corresponding the device capabilities of the selected version, and at step 8, performs the translation according to the retrieved translation map. In case of an error in the Library's processing, steps 9 and 10 return the error to the Manager via the Campaign service; otherwise, at step 11, the translation is returned from the Library to the Campaign service. At steps 12 and 13, the translation is sent to the receiving device. In this manner, an outbound message, update campaign, or the like may be translated to a form adapted to the capabilities of each of the target devices.

In Phase III is shown how the present technique handles inbound events, such as feedback, return/response codes such as error codes, and the like. Phase III commences when a device sends a feedback message at step 14. The Connectivity layer interprets the feedback message as one requiring it to pass the message payload to the Device directory layer at step 15, whereon the Device directory derives the version data appropriate to the originating device at step 16, and calls the Library to translate at step 17. The Library receives the message payload and the version data, and at step 18 gets the appropriate translation map from the Profiles layer. At step 19, the Library executes the translation procedure according to the translation map, and either returns an error to the Device directory layer at step 20 or sends the translation to the Device directory layer at step 21. The Device directory layer then does any required workflow actions triggered by the translation of the feedback message at step 22.

Figure 9:
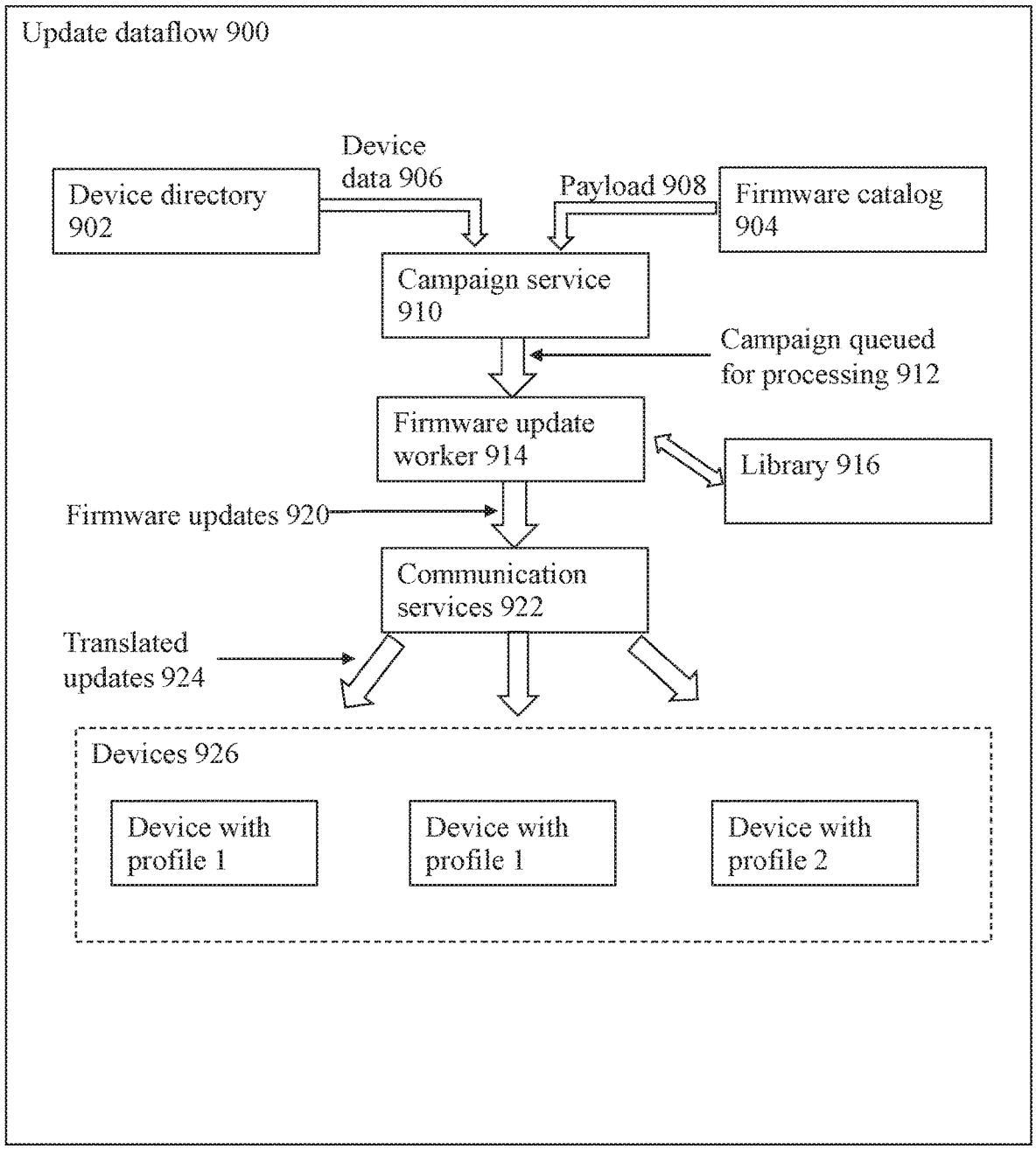
FIG. 9 shows an example of an update dataflow in a device network according to an embodiment of the present technology.

In FIG. 9 is presented an example of an embodiment of a firmware update campaign dataflow 900 in a device network according to an embodiment of the present technology. (As previously described, a firmware update campaign is initiated with a "statement of intent" that does not specify details of the update data at a receiving device level.) Device directory 902 supplies device data 906 to Campaign service 910, and Firmware catalog 904 supplies Payload 908 to Campaign service 910. Campaign service constructs the Campaign data, which is queued 912 for processing by Firmware update worker 914, which invokes translation by Library 916 to produce the Firmware updates 920 that are structured appropriately according to the capability profiles of recipient devices 924. Firmware updates 920 are then passed to Communication services 922 and transmitted to Devices 924. As shown, Devices 924 comprises devices having device capability profiles 1 and 2, and the present implementation of the technology is directed to supplying firmware updates that have been translated to match the appropriate capability for each device in Devices 924.

Figure 10:
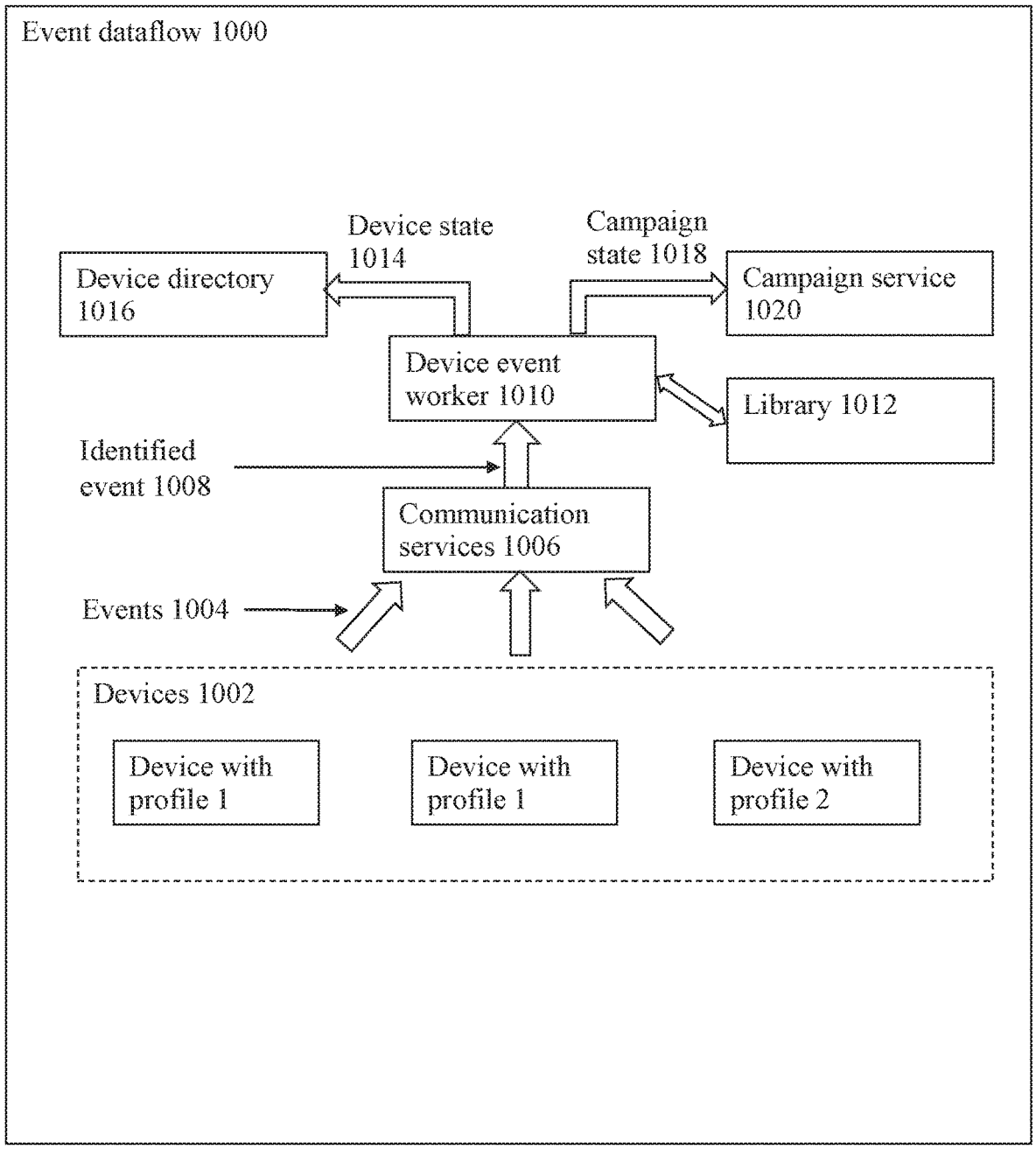
FIG. 10 shows an example of an event dataflow in a device network according to an embodiment of the present technology.

FIG. 10 shows an example of an event dataflow in a device network according to an embodiment of the present technology. The event dataflow follows a backward path from the devices in the network, and the events may represent any form of feedback—for example, responses indicating success or failure of a firmware update of the type exemplified in Phase II of FIG. 8 and in the dataflow of FIG. 9. In any network of heterogeneous devices, the capabilities of the devices may include their capacity to respond to "out-of-line" situations, such as failed data reception, failed updates, and the like. There is therefore a need to provide at the level of the managing system, such as a firmware distributor, for the variations in the responses received from devices having varying feedback capabilities. In the Event dataflow 1000 of FIG. 10, Devices 1002 include devices having profiles 1 and 2. In this example, the feedback responses from devices having these different profiles may differ, and thus need to be interpreted correctly if they are to be acted upon by the other components of the distribution network. Devices 1002 generate Events 1004, each according to its capability profile, and Events 1004 flow to Communication services 1006. The events are associated with identifiers according to the capability profiles of the originating devices, and the identified events flow up to one or more Device event worker components 1010. Device event worker 1010 invokes the services of Library 1012, passing the Identified events 1008, and Library 1012 performs translations according to the device capability profiles specified for the Identified events 1008. Library 1012 supplies the resulting translations to Device event worker 1010, which communicates Device state 1014, derived from the translation for its specified device capability profile, to Device directory 1016. Device directory 1016 is thus operable to act upon the received Device state 1014, for example to make modifications to its stored device data according to the feedback from Devices 1002. Device event worker 1010 is further operable to communicate Campaign state 1018 derived from the translation to Campaign service 1020. Campaign service 1020 is operable, in implementations, to modify firmware updates according to the feedback from Devices 1002.

In this manner, a firmware update campaign service may use the presently-disclosed technology to control updates to firmware in heterogeneous device networks in which devices may have varying levels of firmware installed. It will be clear to one of ordinary skill in the art that the present technology is not limited to firmware updates, but may equally be applied to the distribution of a variety of electronic content in various alternative use cases. The library-based translation service provision of the present technology may thus be applied to a broad class of distribution scenarios at various levels in the software-firmware-hardware stack of an electronic network of devices.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

For example, a service provider may operate at a supervisory or supplementary level in a network, and may provide a service to all or selected users to deploy server or client code that implements at least portions of the present techniques in the various layers of the network, thereby assisting users to benefit from the operational efficiencies enabled by the present techniques. A service according to this implementation may comprise, for example, a cloud computing service, a mesh network, a grid, or the like. Users may in turn provide a downstream service to deploy server or client code that at least selectively implements at least portions of the present techniques at subordinate levels in, for example, a subnet of a network.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A computer-implemented method of operation of a translation manager intermediating message distribution in a plurality of networked electronic devices, comprising:
   receiving at the translation manager a request from a networked electronic device for registration;
   parsing said request by the translation manager to derive an identifier of the networked electronic device;
   creating a pairing of the identifier of the device and a device capability profile comprising at least one capability of the networked electronic device;
   storing the pairing in a data store for use by said translation manager on request to translate a message;
   responsive to a device update to become effective from a time T, updating said at least one device capability profile to become effective from the time T in synchronization with said device update becoming effective; and
   storing an updated pairing in a data store for use by said translation manager on request to translate a message from the time T.

2. The method as claimed in claim 1, further comprising determining by the translation manager at least one capability of the networked electronic device.

3. The method as claimed in claim 2, said determining by the translation manager at least one capability of the networked electronic device comprising retrieving device data from a device directory.

4. The method as claimed in claim 2, said determining by the translation manager at least one capability of the networked electronic device comprising retrieving a capability profile for said networked electronic device as a member of a class of devices.

5. The method as claimed in claim 1, said storing the pairing comprising populating a lookup table.

6. The method as claimed in claim 1, said storing the pairing comprising operating a database.

7. The method as claimed in claim 2, said determining by the translation manager at least one capability of the networked electronic device comprising determining a message format receivable by a further device having a different capability profile from said networked electronic device.

8. The method as claimed in claim 2, said determining by the translation manager at least one capability of the networked electronic device comprising determining a limitation of at least one of the networked electronic device and the further device.

9. The method as claimed in claim 2, said determining by the translation manager at least one capability of the networked electronic device comprising deriving said capability from data supplied by the networked electronic device.

10. The method as claimed in claim 2, said determining by the translation manager at least one capability of the networked electronic device comprising retrieving data defining said capability from a data store.

11. The method according to claim 1, said capability comprising timing data for transmission of said message.

12. The method according to claim 1, said capability comprising firmware image data for the networked electronic device.

13. The method according to claim 1, said capability comprising manifest data for said networked electronic device.

14. The method according to claim 1, said capability comprising at least one resource locator for said networked electronic device.

15. An electronic apparatus comprising processing and storage logic operable as a translation manager intermediating message distribution in a plurality of networked electronic devices, comprising:
   a receiver at said translation manager operable to receive a request from a networked electronic device for registration;
   a parser operable to parse said request by the translation manager to derive an identifier of the networked electronic device;
   a data handler operable to pair the identifier of the device and a profile comprising at least one capability of the networked electronic device;
   a storage handler operable to store the pairing in a data store for use by the translation manager on request to translate a message;
   said data handler further responsive to a device update to become effective from a time T, operable to update said at least one device capability profile to become effective from the time T in synchronization with said device update becoming effective; and said storage handler further operable to store an updated pairing in a data store for use by said translation manager on request to translate a message from the time T.

16. The electronic apparatus according to claim 15, further comprising a capability enumerator operable to determine at least one capability of the networked electronic device.

17. A computer program product stored on a non-transitory computer-readable medium and comprising computer program code operable, when loaded into a computer and executed thereon, to cause said computer to operate processing and storage logic to perform a method of operation of a translation manager intermediating message distribution in a plurality of networked electronic devices, comprising:
  receiving at the translation manager a request from a networked electronic device for registration;
  parsing said request by the translation manager to derive an identifier of the networked electronic device;
  creating a pairing of the identifier of the networked electronic device and a device capability profile comprising at least one capability of the device;
  storing the pairing in a data store for use by said translation manager on request to translate a message;
  responsive to a device update to become effective from a time T, updating said at least one device capability profile to become effective from the time T in synchronization with said device update becoming effective; and
  storing an updated pairing in a data store for use by said translation manager on request to translate a message from the time T.

* * * * *